April 13, 1948.  R. R. TEETOR  2,439,702
PISTON RING
Filed Feb. 9, 1945
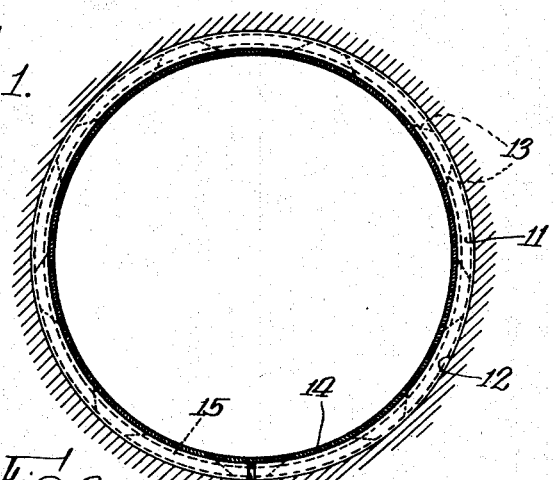
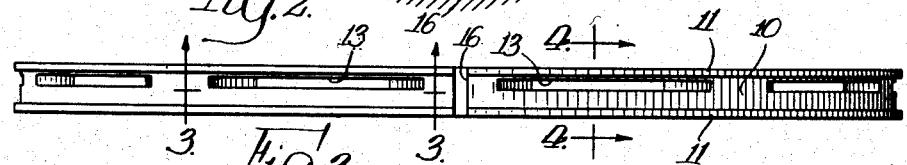
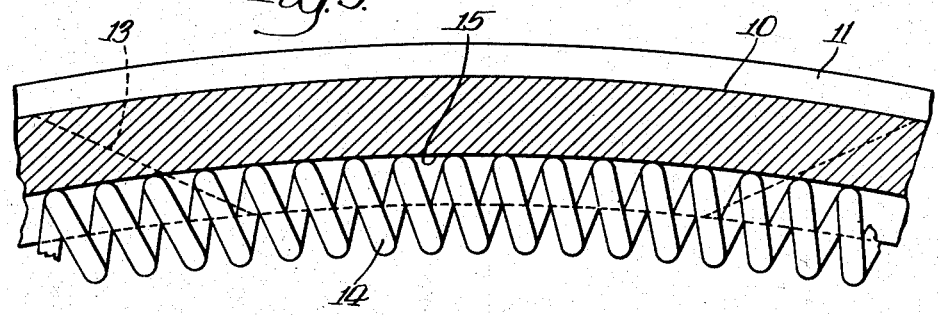
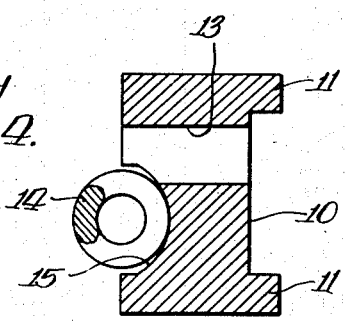
INVENTOR.
Ralph R. Teetor,
BY
Davis, Lindsey, Smith & Shonts
Attys.

Patented Apr. 13, 1948

2,439,702

UNITED STATES PATENT OFFICE 2,439,702

PISTON RING

Ralph R. Teetor, Hagerstown, Ind., assignor to The Perfect Circle Company, Hagerstown, Ind., a corporation of Indiana Application February 9, 1945, Serial No. 576,988

1 Claim. (Cl. 309—45)

The invention relates to piston rings adapted for use in internal combustion engines.

The principal object of the invention is to provide a novel flexible piston ring provided with oil-conducting slots which are so positioned relative to spring means for exerting the expansive force, that flow of oil through the slots is not interfered with and the slots do not interrupt the seat for said spring means.

Other objects and advantages will become apparent from the following description, taken in connection with the accompanying drawings, in which:

Figure 1 is a transverse sectional view of a cylinder and a piston ring embodying the features of the invention.

Fig. 2 is an edge view of the piston.

Fig. 3 is a fragmentary sectional view of the ring, taken on the line 3—3 of Fig. 2.

Fig. 4 is a transverse sectional view taken on the line 4—4 of Fig. 2.

A ring embodying the features of the invention is of a highly flexible character and is provided with spring means within the ring adapted to exert an expansive force throughout the ring, preferably independently of the piston. The ring is provided with an external oil-collecting groove and passages such as slots through the ring to conduct the oil from said groove to the ring-receiving groove in the piston from where it may drain back into the crankcase of engine. The expanding spring means would tend to interfere with the free flow of oil through such slots if both the spring means and the slots were centered in the ring. Moreover, if so centered, the slots would break up or interrupt the surface of the ring against which the spring was seated and would thereby tend to prevent the spring means from exerting an evenly distributed expansive force on the ring.

To avoid such difficulties, the slots and the seat for the spring means are offset from each other. Thus, oil may pass freely through the slots, and the latter do not break up the spring-seating portion of the ring. The ring, while generally rectangular in cross section, is greatly reduced in cross-sectional area by the oil-collecting groove in its outer periphery and a spring-seating groove in its inner periphery as well as the slots, so that it becomes highly flexible and therefore readily expansible by the spring means.

As shown in the drawings, the preferred embodiment of the invention comprises a ring having a rectangular cross section, as shown in Fig. 4. Cut in the outer periphery of the ring is an oil-collecting groove 10 providing a pair of spaced flanges 11 adapted, when expanded, to engage the cylinder wall indicated at 12. To drain off the oil collected in the groove 10, a plurality of passages or slots 13 are provided, extending through the ring to the interior thereof. Such slots are narrow in character and taper inwardly, as clearly shown in Figs. 1 and 2. The slots 13 thus conduct oil collected in the groove 10 to the inner portion of the ring-receiving groove in the piston, from which the oil is free to drain back to the crank case of the engine through the usual passages in the piston (not shown).

The ring is adapted to be expanded by an even pressure exerted throughout the ring, and, to this end, spring means comprising, in this instance, a coiled spring 14, is positioned in a groove 15 cut in the inner periphery of the ring. The spring 14 has its ends intertwined to form a closed annulus, and the groove 15, while having a depth equal approximately to one half the diameter of the spring, has a width somewhat wider than the spring, as will be noted in Fig. 4, to permit the spring to shift freely in the groove. The spring thus seats solely in the bottom of the groove. The grooves 10 and 15 and the slots 13 so reduce the cross-sectional area of the ring that it is highly flexible, and the expansive force of the spring 14 thus readily causes the ring to fully conform to the shape of the cylinder wall. By employing a coiled spring as herein shown, the expansive force exerted by the spring is independent of the piston and particularly of the back of the ring-receiving groove in the piston. In addition to this, the force exerted by such a spring is radially outward and is equal at all points throughout the entire circumference of the ring.

It is, of course, desirable to permit the oil to flow freely through the slots 13 without interference by the spring overlying the inner ends of the slots. For this reason, the spring with its groove 15 is offset from the slots 13, that is, the slots are adjacent one side of the ring and the spring is adjacent the other side of the ring, as shown in Fig. 4. Thus, the inner ends of the slots are unobstructed by the spring and free flow of oil is permitted. Moreover, by so positioning the slots and the spring groove 15, the slots do not interrupt or mutilate the spring-seating portion of the groove, and the spring thus has a full surface on which it may shift. The slots and the spring each may thus perform its full function without interference by the other.

The ring is severed at one point to provide a gap 16 facilitating expansion and contraction. The expansive force exerted by the spring may be adjusted by varying the extent of intertwining of the ends thereof.

I claim:

A one-piece ring for a reciprocatory piston, having an oil-collecting groove in its outer periphery providing a pair of axially spaced flanges for reciprocating engagement with the cylinder wall, a spring-receiving groove in its inner periphery offset toward one side of the ring but located within the axial space between said flanges, a coiled spring seated in said inner groove, and a plurality of radial oil-conducting slots for connecting said oil-collecting groove with the ring-receiving groove in the piston, said slots being located within the axial space between said flanges but offset toward the other side of the ring to avoid centering of said slots in said inner groove whereby oil may pass freely through said slots without inteference by said spring and the spring-seating portion of the inner groove is uninterrupted.

RALPH R. TEETOR.

REFERENCES CITED

The following references are of record in the file of this patent:

UNITED STATES PATENTS

| Number | Name | Date |
| --- | --- | --- |
| 1,767,711 | Solenberger | June 24, 1930 |
| 1,868,744 | Grant | July 26, 1932 |

FOREIGN PATENTS

| Number | Country | Date |
| --- | --- | --- |
| 373,406 | Germany | July 4, 1920 |